US012694746B2

(12) United States Patent
Amaitis et al.

(10) Patent No.: US 12,694,746 B2
(45) **Date of Patent: *Jul. 28, 2026**

(54) ELECTRICAL COMPUTERS AND DIGITAL PROCESSING SYSTEMS INVOLVING INTERPROGRAM OR INTERPROCESS COMMUNICATION REGARDING AMUSEMENT DEVICES AND GAMES

(71) Applicant: CFPH, LLC, New York, NY (US)

(72) Inventors: Lee Amaitis, Las Vegas, NV (US); Andrew Garrood, London (GB)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,129

(22) Filed: Jun. 9, 2023

(65) Prior Publication Data

US 2023/0326284 A1 Oct. 12, 2023

Related U.S. Application Data

(63) Continuation of application No. 17/991,479, filed on Nov. 21, 2022, now abandoned, which is a continuation of application No. 17/152,643, filed on Jan. 19, 2021, now Pat. No. 11,508,203, which is a continuation of application No. 12/687,980, filed on Jan. 15, 2010, now abandoned.

(51) Int. Cl.
*G07F 17/32* (2006.01)

(52) U.S. Cl.
CPC ............ *G07F 17/32* (2013.01); *G07F 17/326* (2013.01); *G07F 17/3288* (2013.01)

(58) Field of Classification Search
CPC ..... G07F 17/32; G07F 17/326; G07F 17/3288
See application file for complete search history.

(56) References Cited

U.S. PATENT DOCUMENTS

| | | | | |
|---|---|---|---|---|
| 2001/0039209 | A1* | 11/2001 | DeWeese | G06Q 50/34 463/40 |
| 2002/0056136 | A1* | 5/2002 | Wistendahl | G06F 16/40 348/E7.071 |
| 2002/0068633 | A1* | 6/2002 | Schlaifer | G07F 17/3244 463/43 |
| 2006/0183547 | A1* | 8/2006 | McMonigle | G07F 17/3288 463/40 |
| 2007/0060380 | A1 | 3/2007 | McMonigle et al. | |
| 2007/0087804 | A1* | 4/2007 | Knowles | G07F 17/3288 463/43 |
| 2009/0254475 | A1* | 10/2009 | Pennock | G06Q 20/10 705/1.1 |
| 2009/0270166 | A1 | 10/2009 | Thukral et al. | |
| 2010/0105464 | A1* | 4/2010 | Storm | G06Q 10/04 463/20 |

FOREIGN PATENT DOCUMENTS

WO 200265350 8/2002

OTHER PUBLICATIONS

Green, Touch Screens with Pop-up Buttons, Apr. 28, 2009, https://www.technologyreview.com/2009/04/28/213470 / touch-screens-with-pop-up-buttons-2/, pp. 1-14 (Year: 2009).*

* cited by examiner

*Primary Examiner* — John Van Bramer

(57) ABSTRACT

Some embodiments may include interaction among sports books. Various other systems and methods are described.

20 Claims, 4 Drawing Sheets

ELECTRICAL COMPUTERS AND DIGITAL PROCESSING SYSTEMS INVOLVING INTERPROGRAM OR INTERPROCESS COMMUNICATION REGARDING AMUSEMENT DEVICES AND GAMES

CROSS-REFERENCE TO RELATED APPLICATIONS

This application is a continuation of U.S. patent application Ser. No. 17/991,479 filed Nov. 21, 2022, which is a continuation of U.S. patent application Ser. No. 17/152,643 filed Jan. 19, 2021 (now U.S. Pat. No. 11,508,203 issued Nov. 22, 2022, which is a continuation of U.S. patent application Ser. No. 12/687,980 filed Jan. 15, 2010, each of which is incorporated by reference herein in its entirety.

DETAILED DESCRIPTION

Figure 1:
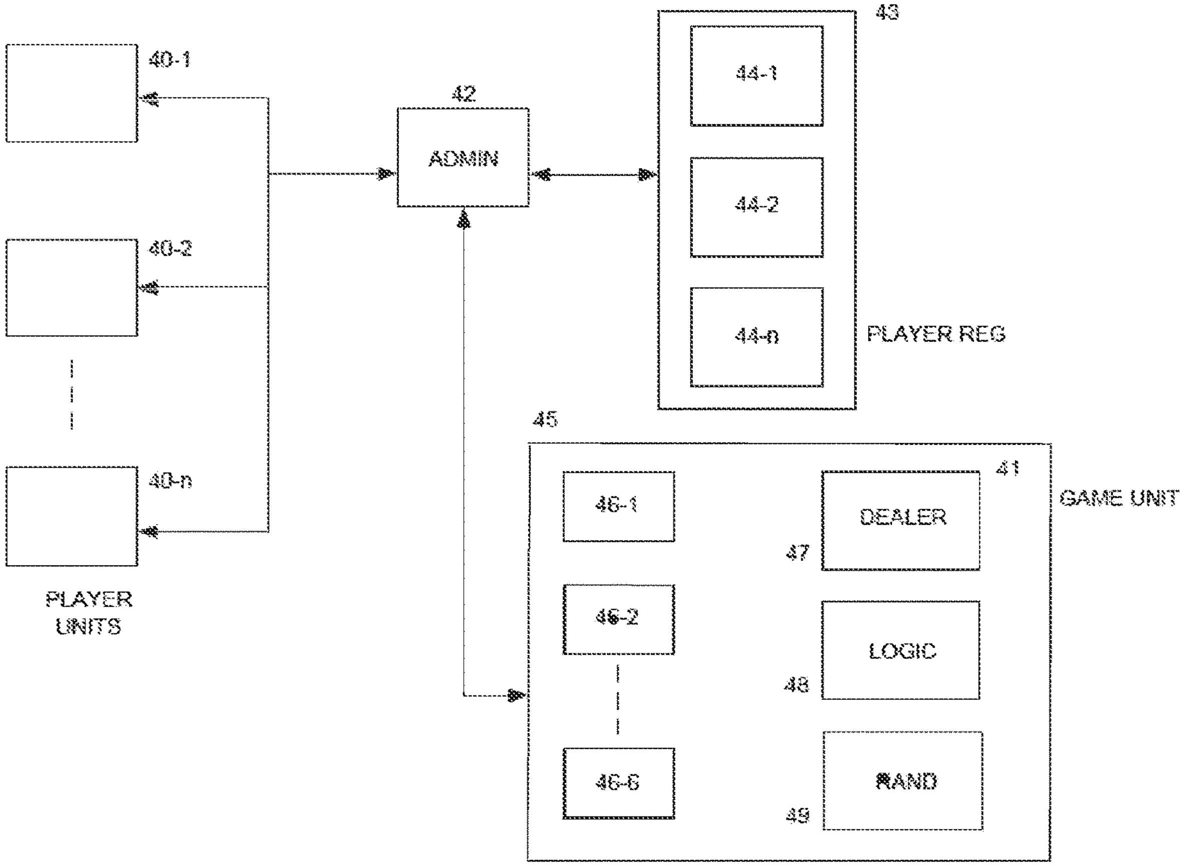
FIG. 1 shows an apparatus for playing a game, according to some embodiments.

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget but does not include anything else.

The term "compose" and variations thereof means "to make up the constituent parts of, component of, or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiments are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. CARDS

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. CASINO COUNTERMEASURES

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XIII. VIDEO WAGERING GAMES

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XIV. APPARATUS FOR PLAYING OVER A COMMUNICATIONS SYSTEM

FIG. 1 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XV. ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVI. REFERENCES

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

XVII. EXAMPLE EMBODIMENTS

Some gambling systems enable users to bet on the outcome of a game, e.g., which team will win, and/or by how much. Gaming operators try to determine accurate probabilities for each game outcome (e.g., win, loss, and point spread) so that they can offer competitive odds to potential bettors who may bet on each outcome. The probabilities (and odds) are typically determined prior to the start of the game based on information existing prior to the game, such as historical data related to each team, player, and coaching staff, ratings and opinions of professionals such as sportswriters and other coaches, and other public and proprietary information related to the game. For instance, some gaming operators use complicated proprietary computer algorithms to determine odds based on pre-existing statistical information and other information. The odds may change during a betting period as bettors wager on one side or another of an outcome (e.g., if many people wager that team A will win and few people wager that team B will win, the odds may become less favorable for a wager that team A will win).

In effect, odds are a gaming operator's "price" to bettors for wagering on a specific outcome (wherein higher odds translate to a lower price for the bettor). When there are a plurality of gaming operators offering odds on a particular outcome to a plurality of bettors, the gaming operators compete with one another to offer a competitive price that will attract bettors who seek the highest payout for their betting dollar. Thus, gaming operators may determine odds based in part on the odds offered by competing gaming operators. Betting behavior can also affect odds. For instance, a high demand for bets that the Chicago Cubs will win their next game against the Phillies may drive up the effective price for that bet. Accordingly, as in other competitive marketplaces, odds determinations often reflect a "market price" for each game outcome, as gaming operators adjust their odds based on the market. The effective market price can change over time as the betting market changes and new relevant information is disclosed, such as an injury of a key Cubs pitcher a day before the game. Notably, amounts wagered by losers on one side of the bet can be used to fund the payout to winners on the other side of the bet. Thus, in large betting markets where there are many bettors on each side of a bet, gaming operators may adjust their odds in an effort to balance the potential payouts on either side of the bet.

However, odds determinations often do not reflect a consensus "market price," e.g., when there are a limited number of market participants or there is insufficient time for the market to assimilate new relevant information into a stable market price. For example, some gaming operators allow users to bet on performance parameters within a game, such as whether a particular player will strike out in a particular at-bat in a baseball game. The betting market is typically opened manually immediately prior to the in-game event, and the odds are often determined manually "on the fly." Even if another gaming operator offered a similar bet, the quick timing of such a bet may prevent gaming operators and bettors from comparing the different odds offered. In these circumstances, the gaming operator may attempt to offer odds without the benefit of a competitive betting market based entirely on the operator's best assessment of the probabilities of the various outcomes.

It may take time and labor to identify a potential in-game betting market (e.g., a market for betting on the outcome of a specific at-bat), determine accurate probabilities and odds for each outcome, offer the odds to bettors, take bets, determine an outcome, and then pay the winners. Because some systems require many of these actions to be performed manually "on the fly," limited manpower may effectively limits the number and extent of in-game wager opportunities a gaming operator can offer. Bets on an in-game event often require a calculation of probabilities and odds in a very short time frame. It can be more difficult to calculate an accurate probability of an in-game outcome when new relevant information becomes available during the game, such as an injury to a quarterback. Inaccurate odds can lead to unnecessarily high prices (and therefore fewer bettors) or unnecessarily low prices (which translates to unnecessarily high payouts to winners).

According to various embodiments of the present invention, a system may enable users to bet on in-game events, such as whether a particular baseball player strikes out in a particular at-bat, and/or more traditional game outcomes, such as which team will win and/or by how much. The system may automatically receive general game information (e.g., team names, player rosters, start time, etc.) from a data feed or other source. From the same data source (or another source), the system may also automatically receive a stream of real-time game information, such as elapsed time, batting line-up, runs scored, errors on a play, pitch information (strike, ball, foul), etc.

Odds for each event, such as a strike-out, may be calculated based on an odds database and algorithm stored on the system. The algorithm may use information from the real sport (such as a player's batting average) and may be updated based on in-game events. (E.g., if Barry Bonds strikes out four times with the same pitcher, his odds of getting a hit off that pitcher may decrease.).

As soon as a specific gambling event is completed (e.g., as soon as Barry Bonds finishes his at-bat by striking out or hitting a home run), the system settles the bets placed on that betting event. At the same time (or another time), the system may open the betting for another event (e.g., the next at-bat). In one embodiment, a human operator clears the bets after each event. For example, the human gaming agent may select "strike out" immediately after Barry Bonds strikes out. This operation may cause the system to immediately settle all the bets on the present Barry Bonds at-bat and also open bets for the next betting event (e.g., the outcome of the next batter's at-bat). In other embodiments, the system may use automated information (e.g., a data feed) to determine event outcomes (like a strike-out) in real time. In some embodiments, human gaming agents may assist with error correction to ensure that the system identifies correct outcomes and resolves all bets properly.

Users may place bets and otherwise interact with the system and other users via an interface such as a gaming table or mobile touch-screen gaming device, which may be configured to display a live TV feed of an event such as a baseball game with an optional touch-sensitive betting interface overlay. In one embodiment, when Barry Bonds steps up to the plate, a user may touch the image of Barry Bonds (or other image or icon) to trigger the betting interface overlay that enables the user to select and place a specific bet concerning Barry's at-bat. To bet that Barry will get a single, the user may touch an image of first base (or provide another appropriate input).

Various embodiments of the system may enable gambling on many different types of outcomes within a single game or other event, such as whether a particular runner steals a particular base, the number of runs scored in an inning, whether a pitcher throws a ball or strike on a given pitch, etc. The system may open and close each betting event based on the start and finish time of that particular event. The system can also be applied to a variety of sports as well as other events, such as elections (e.g., whether Barack Obama will win New Hampshire in the upcoming 2008 presidential election). It should be appreciated that various embodiments of the invention may manage many different betting markets at simultaneous or overlapping times. Each betting market may be opened, closed, and resolved based on the terms of that specific betting market, independently of other betting markets.

It should be recognized that various embodiments may include any type of wager, such as, for example, in-game wagers on sports or other events, wagers on outcomes of games or other events, and so on. It should be recognized that various embodiments may include any systems and/or methods for determining initial and/or future odds for any wager, such as, for example, an exchanged based system, a wager line set by a sports book algorithm and/or employee, and so on. It should be recognized that various embodiments may include any system and/or method for placing and/or managing wagers, such as, for example, a centralized computer system, a distributed computer system, one or more servers, one or more client computers, an in person system, a ticket system, a mobile system, and so on. Some examples of wager types, systems and methods for determining odds, and systems and methods for placing and managing wagers are described in U.S. patent application Ser. No. 12/258,297 to Storm and entitled Wager Market Creation and Management, which is hereby incorporated herein by reference.

Some embodiments may include wagers at a sports book or other venue for placing wagers on one or more competitions. Some example competitions on which a wager may be placed at a sports book may include auto racing, baseball, basketball, boxing, football, golf, hockey, and horse racing. Each competition type may have a different set of odds associated therewith.

In auto racing for example a sports book may list some number of individual drivers and/or a field (all other) option. Each individual driver and/or the field may be associated with some odds for each type of bet. For example, Jeff Gordon may be listed at 4-1, Jeff Burton at 15-1, Casey Atwood at 100-1, etc. If you bet $10 on Burton 15-1 and he goes on to win the race, you win $150 plus your $10 back, for a total payoff of $160. Matchup wagers may be available in which two or more drivers are paired against each other in a head-to-head wager. Odds for such a wager may also be provided. For example, a matchup may pit Dale Jarrett (minus 145) against Bobby Labonte (plus 125). If you bet $145 on the favored Jarrett, the payoff would be $100 plus your $145 back, for a total of $245. If you bet $100 on the underdog Labonte, the payoff would be $125 plus your $100 back, for a total of $225. Various other wagers may also be available such as, for example, an over/under on a number of cautions in a race, a car manufacturer that will win the race, in-game wagers, and so on.

In baseball for example, a sports book may list each team matchup with an odds associated with each team of each matchup. If a team on which a wager is placed wins a matchup, the payout to the winner may vary according to the odds. In some embodiments, baseball odds are shown using a money line.

In a money line, odds may be based on some dollar value (e.g., $1). In a money line, A "minus" preceding a number indicates the team is a favorite. A "plus" preceding a number indicates the team is an underdog. For example, if the Braves' odds are −120, this may mean that a $12 bet would win $10, for a return of $22. As another example, if the Dodgers' odds are +110, this may mean that a $10 bet would win $11, for a return of $21. Various types of money lines exist, such as dime lines and 20-cent lines and may be used in various embodiments. Some embodiments may not list a price for an underdog in a matchup but may instead use a house line for underdogs. Some embodiments may include various other wagers, such as, for example, an over under on a total runs scored, a run line, a parlay in which a bettor may select multiple teams to win, in-game wagers, and so on.

Money lines may change as wagering proceeds. In some embodiments, an odds determined by the money line at the time of a wager may be the odds used to payout a wager at the end of a wager. In some embodiments, the money line at the end of a wagering period may be used to determine the odds of wager even if the money line was different when the wager was placed.

In basketball, for example, a sports book may operate similar to baseball. In some embodiments, a point spread may be used so that a bet on a team to win will win only if the team wins by the point spread. In some embodiments, the odds may be the same for all wagers, but the point spread may be changed. For example, a point spread may increase as more bettors wager on a team to win, similar to a change in the odds discussed above with respect to baseball. Some embodiments may allow "teasing" of a point spread (i.e., changing the point spread) in exchange for a change to the odds. Various other wagers may be included in some embodiments, such as parlays, over under on point totals, in game wagers, and so on.

In boxing, for example, a sports book may operate a money line similar to a baseball money line described above. In hockey and football, for example, a sports book may operate a money line similar to a basketball money line described above.

In golf, for example, a sports book may operate a wagering method and/or system similar to auto racing described above. For example, a sports book may list a number of individual golfers and a field. Each option may be associated with an odds for each type of bet (e.g., to win a tournament). For example, Tiger Woods may be listed at 2-1, Tom Lehman at 25-1, Bob May at 100-1, etc. If you bet $10 on Lehman at 25-1 and he goes on to win the tournament, you win $250 plus your $10 back, for a total payoff of $260. A sports book may also include matchup propositions between two or more golfers. In some embodiments, one golfer may be matched against two or more golfers in such a proposition. Various other wagers may be included in some embodiments, such as over under on the winning score, over under on the lowest round by any golfer, over under on a finishing position of a golfer, in-game wagers, and so on.

In horse racing, for example, a sports book may provide a wide array of betting options. For example, a win, place, show, across the board, exacta, quinella, trifecta, superfecta, daily double, pick six, and so on wagering options may be available as well as any in-game wagers. Each wager option may be associated with a money line such as those described above or other type of odds system.

As discussed above, some embodiments may include various events or propositions that may be wagered upon, such as outcomes of an election, winnings of an award, and so on. Some embodiments may include wagers on an outcome of a season of a game, a season of a television show (e.g., Survivor), and so on. Some embodiments may include wagers on other casino games (e.g., craps, blackjack, slots, poker). Such bets may include bets on individual games, bets on other people, bets on statistics of the games, bets on tournaments of such games, and so on. It should be recognized that the examples of various wager types and odds types are given as non-limiting examples only and that various embodiments may include any desired wager types and/or odds types.

In some embodiments, multiple sports books may offer a same or similar wager proposition (e.g., that the Bears will win a particular football game). For example, in Las Vegas and many other jurisdictions in which gambling is legal, many casinos operate their own sports books. At each one of these sports books, bettors may wager on a same or similar proposition.

Some sports books may compete for customers in a market by adjusting odds of propositions. Some sports books may have odds that are different from other sports books because more fans of one team than another happen to go to that sports book and place similar wagers thereby changing the odds of those wagers. Some embodiments may allow one or more sports books to communicate regarding odds. For example, such communication may allow sports books to establish a consensus odds for a desired market. Some embodiments may allow one or more sports books to trade responsibility for one or more wagers. For example, such ability may allow a sports book to adjust a number of wagers on a side of a proposition to reach a desired balance.

Figure 2:
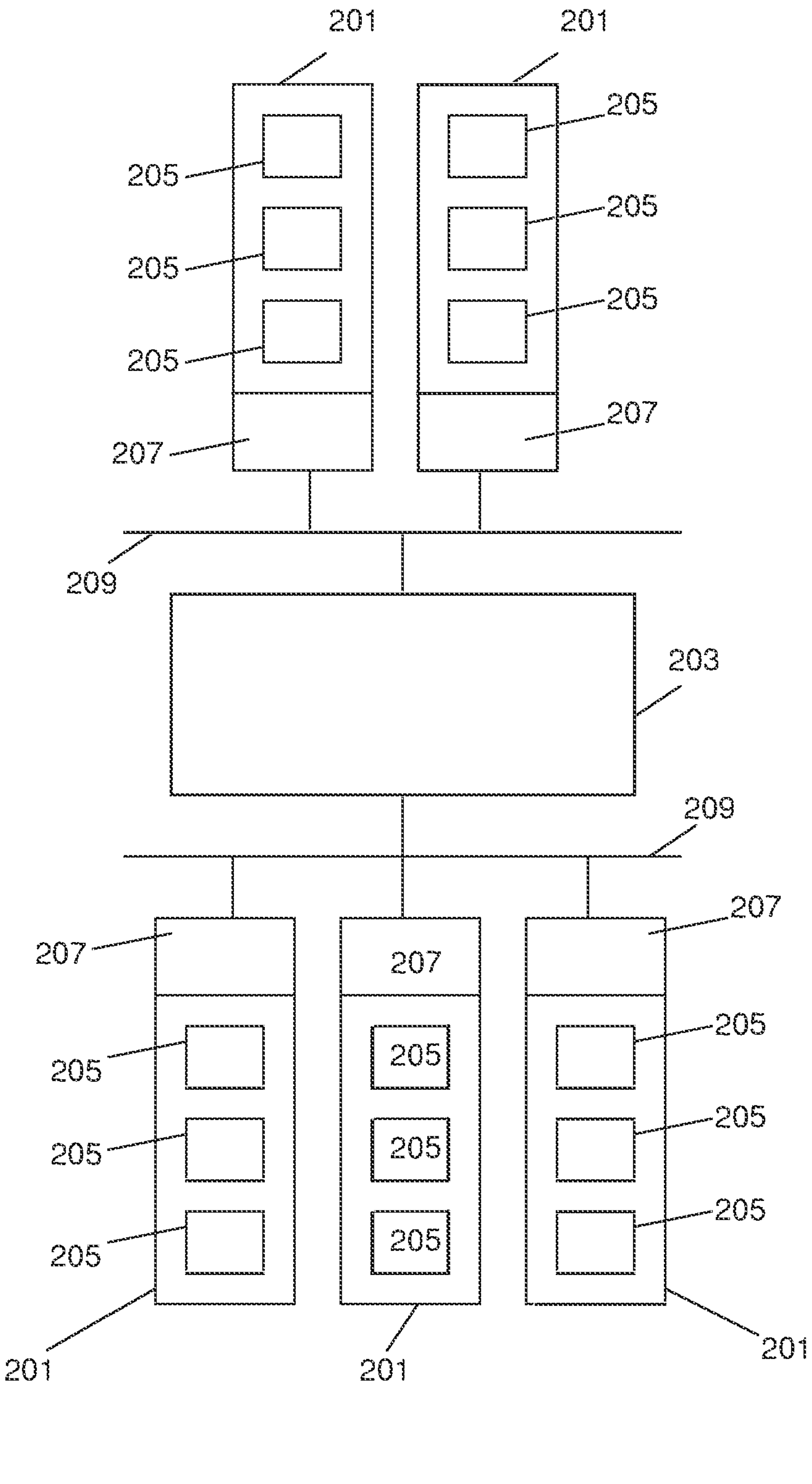
FIG. 2 shows an example of multiple wagering venues interacting.

FIG. 2 illustrates an example of multiple sports books 201 interacting through a central system 203. Central system 203 may include one or more computing devices configured to execute one or more sets of instructions to perform one or more methods. Interaction through the central system may allow one or more of the sports books to establish a consensus odds for a wager offered at the one or more of the sports books. Interaction through the central system may allow one or more of the sports books to adjust a risk exposure for one or more sides of one or more wagers. It should be recognized that while the example of FIG. 2 includes a central system, some embodiments may not include such a system and/or such a system may have different functionality. For example, some embodiments may include a decentralized system (e.g., a peer to peer system), some embodiments may include a sports book that performs the actions of the central system, some embodiments may include a central system that controls the sports books, and/or any other arrangement may be used as desired in various embodiments.

As illustrated in FIG. 2, each sports book 203 may include one or more wagering interfaces 205. A wagering interface may allow a bettor to place a wager on one or more proposition. Each proposition may have odds associated therewith (e.g., a money line). A wagering interface may include a kiosk, a computer terminal, a mobile gaming device, a home computer, a teller, a gaming table, and so on. At each wagering interface 205 a bettor may, for example, place a wager, view odds for a wager, collect winning from a wager, and so on.

As illustrated in FIG. 2, each sports book may include one or more controllers 207. Controller 207 may include a wagering server configured to perform any desired actions regarding monitoring, settling, regulation, recording, verifying, and so on regarding wagers. Controller 207 may be configured to establish odds, determine which propositions may be wagered upon, establish a desired level of risk tolerance for a wager, and so on. A controller may take input from an oddsmaker, a casino operator, one or more wagering interfaces 205, and so on (e.g., through a communication network and/or interface).

A sports book 201 may include a physical location at a casino in which wagering on sports propositions may be performed. It should be recognized that sports books may not be limited to physical locations. Some embodiments may include virtual sports books such as online sports books, sports books that may be accessed from mobile devices, and so on. In the illustrated example of FIG. 2, sports books at the top of the figure may be in one continent and sports books at the bottom of the page may be in a different continent. It should be recognized that some embodiments may include any number of sports books with any configuration in any location.

Sports books 201 may communicate with one another and/or a central system 203 using a communication network 209. Such communication may be controlled by respective controllers 207. In a centralized embodiment as in FIG. 2, such communication may be to and/or from central system 201. In a decentralized embodiment, such communication may be among the various sports books 201.

Central system 203 may receive and/or transmit information to and/or from sports books 201. Central system 203 may receive information about odds for various wagers at each of the sports books 201. Central system 203 may determine a consensus odds for such wagers based on the received odds. Central system 203 may transmit an indication of the consensus odds to one or more of the sports books 201.

In some embodiments, central system 203 may determine markets in which one or more sports books compete. Such markets may be physical markets and/or demographic markets. For example in the illustrated embodiment of FIG. 2, a market may be a continent so the bottom sports books may form one market and the top sports books may form a second market. A market may be a demographic market that may span continents, so a high roller sports book in one continent may form a market with a high roller sports book in another continent. In some embodiments, a consensus odds may reflect a desired market in which a sports book may compete.

Sports books 201 may request such information from central system 203. Central system 203 may provide such information unilaterally, as a service, in connection with a feed of gaming information and so on. Sports books 201 may be operated by a same owner that may operate central system 203. A sports book that receives such consensus odds information may adjust an odds offered for a wager based on the consensus odds for the wager (e.g., to match the consensus odds). In some embodiments, a sports book may request and/or receive information about odds offered at one or more sports books and determine based on such odds how to adjust odds for a wager at the sports book. Some sports books may request that such individualized wager information may not be disseminated but rather only information in a consensus format be disseminated.

In some embodiments, a sports book 201 may determine that a level of risk associated with a wager is too great at an odds level (e.g., at a received consensus odds). The sports book may facilitate an exchange of responsibility for one or more side of the wager. Central system 203 may act as an exchange through which the sports book may buy responsibility for a first side of a wager and/or sell responsibility for a second side of a wager to one or more other sports books. Such an exchange may operate similar to a financial instrument exchange. Such an exchange may allow a first sports book to place a bid and/or offer on responsibility for a side of a wager. Such an exchange may allow a second sports book to hit or lift the bid or offer to enter into a transaction in which responsibility for a side of a wager is transferred through the exchange. The exchange may perform one or more clearing functions locally and/or remotely for such a transaction. One example of an exchange-like system for wagers is described in U.S. Pat. No. 7,233,922 to Asher and entitled System and method for wagering-based transferable financial instruments, which is hereby incorporated herein by reference.

Figure 3:
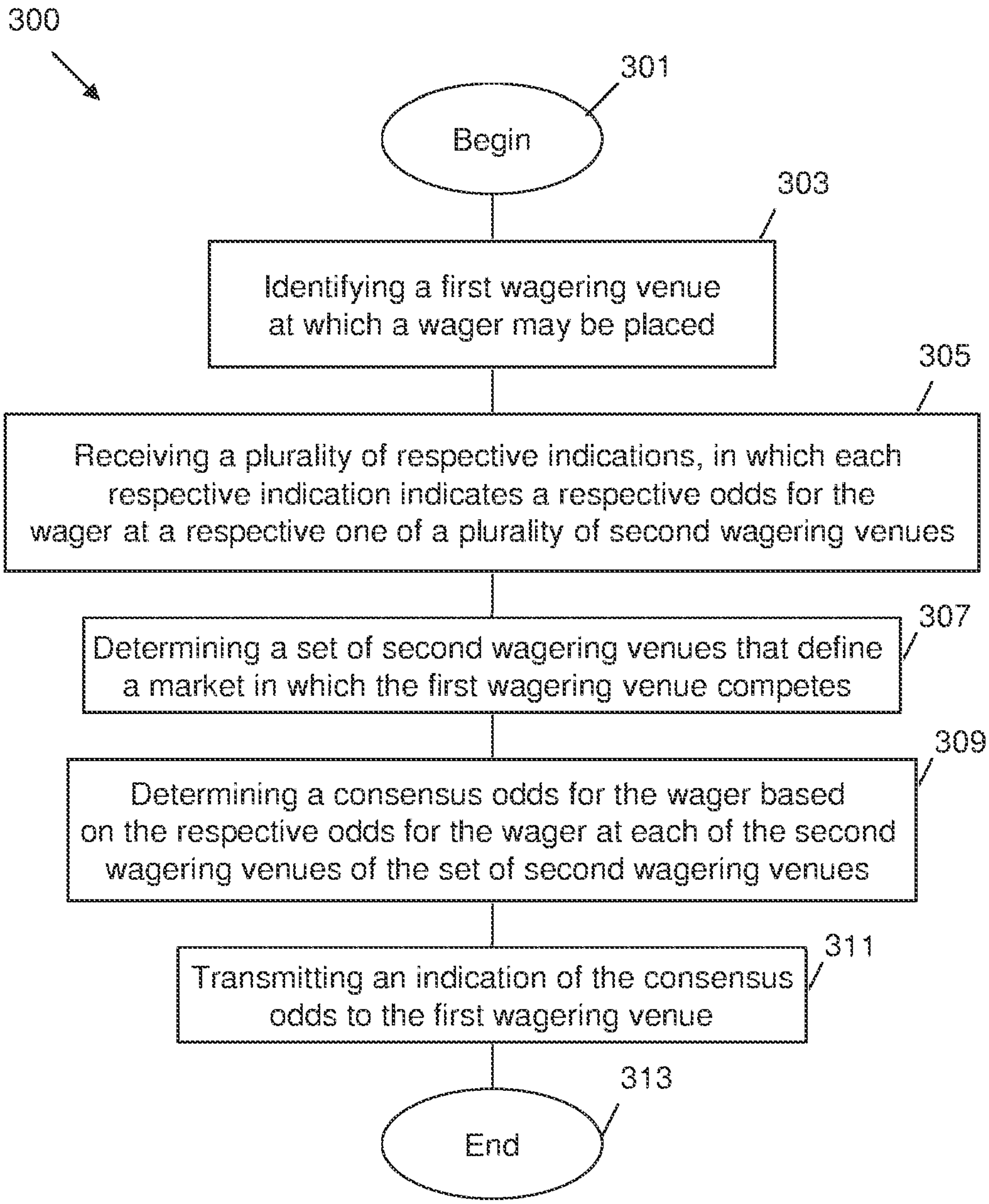
FIG. 3 shows an example method that may be performed in some embodiments.

FIG. 3 illustrates an example method 300 that may be performed in some embodiments to determine a consensus odds. Such a method may be performed by a central system 203, by a sports book 201, and/or by any desired element. Such a consensus odds may be used by one or more sports book to determine an odds for a wager so that the sports book's odds are competitive with the odds offered by other sports books. Such a consensus odds may be used by a sports book to determine an odds for a wager so that the sports book does not have to otherwise determine odds for the wager (e.g., by hiring an oddsmaker). Such a consensus may be used to help establish odds in low liquidity and/or fast paced wagers such as in-game wagers described above by increasing the pool of wagers from which the odds may be determined. Information about odds from at one sports book may be used at another sports book to adjust odds at that other sports book to compete with the first sports book as desired. Method 300 may begin at block 301.

As indicated at block 303, some embodiments may include identifying a first wagering venue at which a wager may be placed. Such a wagering venue may include a sports book. Identifying may take place at a central system, by the wagering venue, by a computer, and so on. In some embodiments, identifying may take place in response to a request from the wagering venue. In some embodiments, identifying may take place in response to determining that an odds for the wager is different than a consensus odds. In some embodiments, identifying may include identifying all wagering venues at which the wager may be placed. It should be recognized that while a single wager may be referred to in some examples, some embodiments may include multiple wagers that may be similar and/or identical. For example, a wager on a basketball team with a first spread may be considered a same wager as a wager on a basketball team with a different spread. It should be recognized that any variation in a wager from any other wager may still have both wagers considered to be the same wager as desired for operation of some embodiments. In some embodiments, a wager may have a same or similar underlying proposition (e.g., the field will win, the Bears will win) and/or may have a same or different related criteria (e.g., different spread, different members of the field, different levels for an over under bet, and so on). By allowing such deviation in wagers, a broader sampling of odds for similar wagers may be obtained. In some embodiments, wagers may be required to be identical or nearly identical before they are considered a same wager for purposes of determining a consensus odds. A wager may include an in game wager, a wager on a competition, a wager on a casino game, and so on.

Some embodiments may include identifying a wager that may be placed at the first wagering venue. Identifying a wager may include receiving information about the wager, such as form a computer system associated with the wagering venue, from a camera recording wagering at the first venue, and so on.

As indicated at block 305, some embodiments may include receiving a plurality of respective indications, each respective indication may indicate a respective odds for the wager at a respective one of a plurality of second wagering venues. The second wagering venues may include one or more other sports books. In some embodiments, an odds form the first wagering venue may also be received. In some embodiments, such indication may identify to a central system or other element performing the method what the odds for the wager and/or a similar wager if desired are at the second wagering venue. In some embodiments, the indication may be a relative indication to a base odds, identifying that the odds are higher or lower than a base odds. In some embodiments, the indication may include an indication of a spread, underdog, in-game propositions, or other elements of a bet in addition to or as an alternative to the odds. Such indications may be received in response to a querying by a central system, periodically, as the odds change at each venue, continuously, as a live feed, and so on as desired.

As indicated at block 307, some embodiments may include determining a set of second wagering venues that define a market in which the first wagering venue competes. In some embodiments, a market may include a geographical market, such as venues in a particular city or block. In some embodiments, a market may include a demographic market, such as venues that cater to a particular clientele. A market may include any desired set of parameters in any specificity. In some embodiments, all of the second wagering venues may be in the market. In one example, some wagering venues that cater to high rollers may form a market with the first wagering venue that also caters to high rollers. Wagering venues may be located geographically disparate from one another. For example, in some embodiments, one of the second wagering venues in a same market as the first wagering venue may be located on a different continent. In another example, some wagering venues on the strip in Las Vegas may form a market with the first wagering venue that is also on the strip in Las Vegas.

As indicated at block 309, some embodiments may include determining a consensus odds for the wager based on the respective odds for the wager at each of the second wagering venues of the set of second wagering venues. Determining a consensus may include performing any desired mathematical calculation on the received data. The data may include data regarding odds offered at the first wagering venue in some embodiments. In some embodiment the data may not include information regarding odds offered at the first wagering venue. In some embodiments, determining a consensus may include determining an average, a mean, a median, a mode, a highest, a lowest, and/or applying any desired mathematical formula. Such a determination may be performed periodically, in response to receiving an updated odds from one or more second venues, in response to a request, and so on.

Some embodiments may include determining a respective effect on the market for each of the second wagering venues. Such determining may include, for example, receiving an indication of the effect from the first wagering venue, receiving a ranking of venues in the market from the first wagering venue, calculating similarities based on distance, demographics of clientele and so on. Such a determination may be performed based on information provided by one or more wagering venues and/or information collected otherwise.

In some embodiments, determining a consensus may include determining a consensus based on such effects. For example, such effects may be used as weights in a formula for determining a consensus such that venues that have a larger effect on the market are weighed more than venues that have a smaller effect on the market. Some embodiments may include determining the consensus odds such that each of the respective odds for the wager at each of the second wagering venues of the set has an impact on the consensus odds that is proportional to the respective effect of the respective one of the second wagering venues on the market.

In some embodiments, a consensus regarding other elements of a wager may also be determined. For example, a consensus regarding a spread may be determined, a consensus regarding members of a field may be determined, a consensus regarding a level for an over under bet may be determined, and so on). In some embodiments, determining a consensus may include weighting wagers based on similarity to a desired wager such that wagers that are the same or very similar are weight more in a calculation than wagers that are less similar.

As indicated at block 311, some embodiments may include transmitting an indication of the consensus odds to the first wagering venue. The indication may be transmitted from a central system or any desired computing device to a sports book in some embodiments. The indication may be transmitted in response to a request, in response to making a determination of the consensus, periodically, and so on.

In some embodiments, method 300 may include offering the wager. Such an offer may be made from the first wagering venue, from any system that determines the consensus odds, through an online system, and so on. The wager may be offered based on the consensus odds and/or any other information such as information regarding odds at individual venues. In some embodiments the wager may be offered with the consensus odds.

It should be recognized that while various examples are given in terms of a consensus odds, that some embodiments may include determining any consensus regarding any element of any possible wager. It should be recognized that while a consensus may be transmitted in some embodiments, alternatively and/or additionally, individual information about odds or other elements of a wager at individual venues may also be transmitted. Such information may be used by a receiving venue for advertising and/or informational purposes. In some embodiments, receiving such information and/or keeping such information from being transmitted may be a premium service. Such information may be transmitted upon request, periodically, in response to an action, and so on.

Some embodiments may include gathering any types of information about any number of wager opportunities in any number of wagering venues. Some embodiments may include distributing any information about collected information about wagers to any destination. Such information may include the information collected and/or any transformation on one or more pieces of such information. Such distribution may be performed as a service to wagering venues or individuals. Such distribution may be performed through a website. Such distribution may be performed for a fee from the destination.

Method 300 may end at block 313. It should be recognized that method 300 is given as an example only and that any alternative methods with more, fewer, alternative, differently ordered, and so on actions may be performed in some embodiments.

Figure 4:
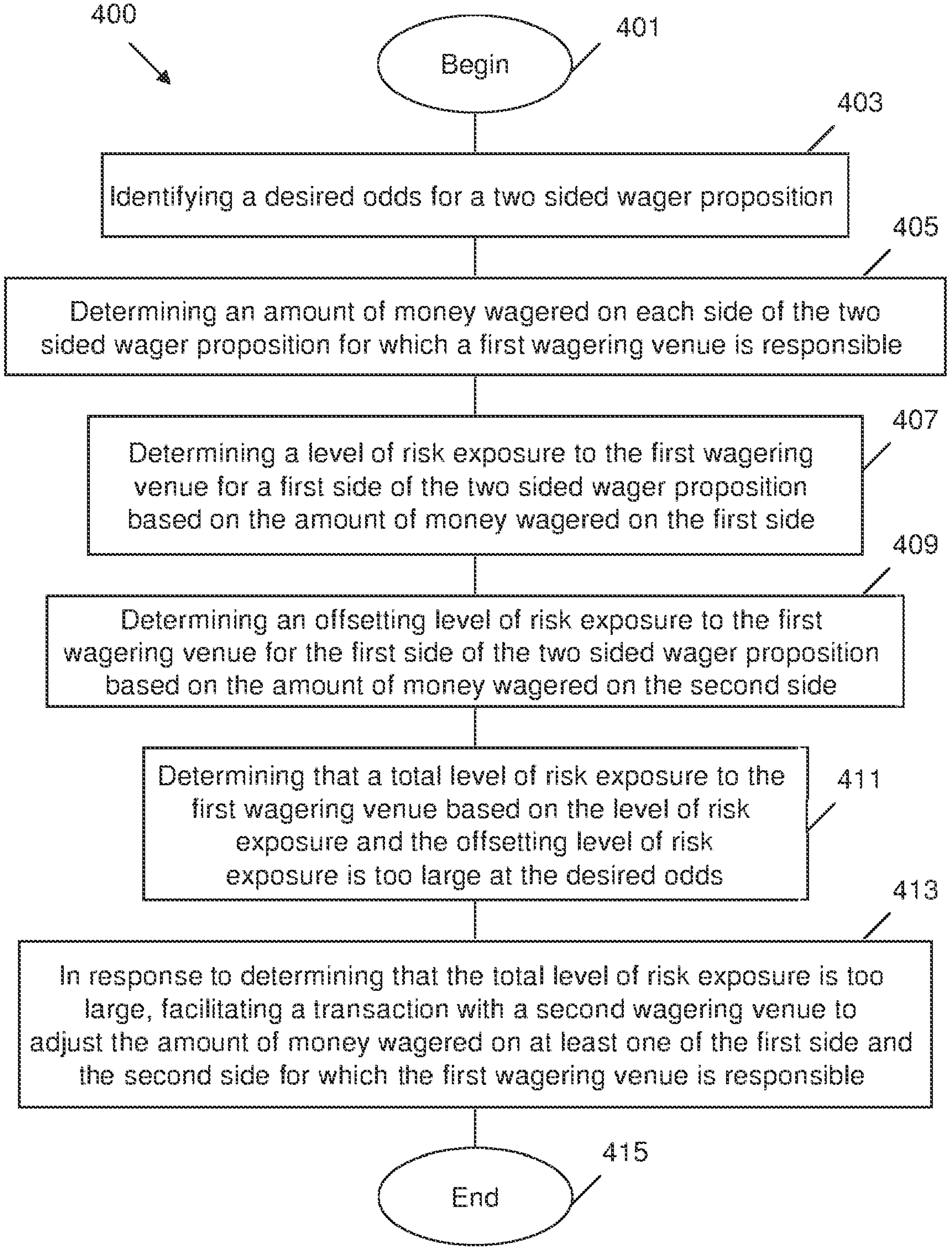
FIG. 4 shows an example method that may be performed in some embodiments.

FIG. 4 illustrates an example method 400 that may be performed in some embodiments to adjust a responsibility for a wager by a sports book. Such a method may be performed by a central system 203, by a sports book 201, and/or by any desired element. Such an adjustment of responsibilities may be used to keep risk at a desired level, for example, so that a sports book may offer competitive odds based on a consensus odds for a wager without risking a giant loss of money. Responsibility for one side of a wager may be traded for money, responsibility for another side of a wager, and so on. Responsibility for a wager may be traded form one wagering venue to another and/or from/to any desired sour or destination. Method 400 may begin at block 401.

Responsibility for a side of a wager may include the right to take legal ownership of money or other valuables based on a loss of the side of the wager. Responsibility for a side of a wager may include the obligation to make a payment based on a win of the side of the wager.

As indicated at block 403, some embodiments may include identifying a desired odds for a two sided wager proposition. A two sided wager proposition may include an outcome of a competition, such as who will win a game of baseball, an in game wager, and so on. Some embodiments may include a wager with any number of sides. Identifying the desired odds may include selecting the odds, receiving an indication of the odds, determining the odds, and so on. The odds may include an odds based on odds offered by one or more wagering venues, such as consensus odds described above. Some embodiments may include determining consensus odds such as by method 300.

As indicated at block 405, some embodiments, may include determining an amount of money wagered on each side of the two sided wager proposition for which a first wagering venue is responsible. Such determination may include receiving information form one or more wagering interface, from one or more wagering venues, and so on. Such a determination may include summing together an amount of money that a wagering venue may be responsible for if a respective outcome of the wager occurs. Such a determination may include summing together an amount of money that a wagering venue may take ownership of if a respective outcome of the wager occurs.

As indicated at block 407, some embodiments may include determining a level of risk exposure to the first wagering venue for a first side of the two sided wager proposition based on the amount of money wagered on the first side. Such a level of risk exposure may take any form. In one example, such a level of risk exposure may include an amount of money that the wagering venue may be obligated to pay out. In some embodiments such a determination may include no additional action that the actions of block 405. Some embodiments may include reading from a database after performing block 405. Some embodiments may include performing one or more calculations on the results of block 405. Some embodiments may include determining a first amount of money that the first wagering venue may be responsible for paying out if the first side of the wager wins based on the amount of money wagered on the first side.

As indicated at block 409, some embodiments may include determining an offsetting level of risk exposure to the first wagering venue for the first side of the two sided wager proposition based on the amount of money wagered on the second side. Such a level of risk exposure may take any form. In one example, such a level of risk exposure may include an amount of money that the wagering venue may be take ownership of. In some embodiments such a determination may include no additional action that the actions of block 405. Some embodiments may include reading from a database after performing block 405. Some embodiments may include performing one or more calculations on the results of block 405. Some embodiments may include determining a second amount of money that the first wagering venue may take ownership of if the second side of the wager wins based on the amount of money wagered on the first side.

As indicated at block 411, some embodiments may include determining that a total level of risk exposure to the first wagering venue based on the level of risk exposure and the offsetting level of risk exposure is too large at the desired odds. Determining the total level of risk exposure may include performing one or more mathematical calculations on the level of risk exposure and the offsetting level of risk exposure. In some embodiments such a calculation may include subtracting the offsetting risk exposure from the risk exposure. In some embodiments determining that the level is too large at the desired odds may include determining that the level is above a certain threshold. In some embodiments, the threshold may be based on expected future wagers at the desired odds. In some embodiments, the threshold may be based on other wagers placed at the wagering venue. In some embodiments, for example, if a wagering venue has a total risk above 1 million dollars on a certain side of a wager, the wagering venue may determine that continuing to offer the side of the wager at the odds may result in too much risk for the wagering venue. It should be recognized that any method of determining that a level of risk is too large at a given odds for a wager may be used in various embodiments. Some embodiments may include determining a total amount of money that the first wagering venue risks based on the first amount of money and the second amount of money. Some embodiments may include determining that the total amount of money is too large at the desired odds.

As indicated at block 413, some embodiments may include facilitating a transaction with a second wagering venue to adjust the amount of money wagered on at least one of the first side and the second side for which the first wagering venue is responsible. In some embodiments, such facilitating may take place in response to determining that the total level of risk exposure is too large. In some embodiments, such facilitating may include trading responsibility for one or more wagers on an exchange. Such responsibility may be traded with one or more other wagering venues and/or any other desired entity. For example, in some embodiments, a buy or sell order for responsibility on a side of a wager may be submitted to an exchange. The exchange may match buyers and sellers and perform any functions to bring about an exchange of responsibility. Such a transaction may allow the wagering venue to readjust its risk level so that it may offer the wager at the desired odds.

In some embodiments, such facilitating may include placing at least one of an order to buy responsibility for wagers on the second side on a wager exchange and an order to sell responsibility for wagers on the first side on the wager exchange. It should be recognized that any method of performing such trading on with any system or method for exchanging may be used. In some embodiments, blocks of wagers may be traded. In some embodiments individual wagers may be traded. In some embodiments portions of wagers may be traded. In some embodiments, auctions for wagers may be held. In some embodiments bids and offers and hits and takes similar to a stock exchange may be used. In some embodiments, dark pools trading systems may be used. In some embodiments, time in force, execute or cancel, stop loss, and or any other desired orders may be used.

In some embodiments, a first wagering venue may pay another wagering venue or be paid by another wagering venue to take responsibility for a wager. The amount paid may be determined through a bidding process, through a reverse auction, through an exchange based system, and so on. In some embodiments, if a first wagering venue offers makes such an offer through an exchange, a portion of the offer may be filled by one or more second wagering venues. For example each of ten second wagering venues may agree to take responsibility for respective ten percents of the wager. In some embodiments, if an exchange determines that multiple wagering venues are interested in an offer regarding a change of responsibility for a wager, the exchange may use a first in first out method of determining matching desires, a pro rata method of filling matching desires, and so on. A matching engine may be used by an exchange to determine that desires match for an exchange.

Some embodiments may include offering the wager at the desired odds. For example a wagering venue that performs the method 400 may then offer the wager after reaching a level of acceptable risk at the odds.

It should be recognized that while various examples are given in terms of a desired odds, that some embodiments may include determining any desire regarding any element of any possible wager. It should be recognized that while a consensus may be used in some embodiments, in some embodiments, individual information from one or more wagering venues may be used.

Method 400 may end at block 415. It should be recognized that method 400 is given as an example only and that any alternative methods with more, fewer, alternative, differently ordered, and so on actions may be performed in some embodiments.

It should be recognized that while some examples are given in terms of a sports book, various embodiments may include any desired wagering venue, such as, for example, a remote computer terminal, a mobile gaming device, a casino table, any area of a casino, and so on. It should be recognized that while various example systems are shown and described having certain elements, that in various embodiments, any system with any elements having any functionality may be used. It should be recognized that while various examples of methods having example acts are described that various embodiments may include any method having any acts in any order.

XVIII. FURTHER EMBODIMENTS

A. An apparatus comprising:

a processor; and a machine-readable medium having stored thereon a set of instructions, which when executed by the processor, cause the apparatus to perform a method comprising:

identifying a wager that may be placed at a first wagering venue;

receiving a plurality of respective indications, in which each respective indication indicates a respective odds for the wager at a respective one of a plurality of second wagering venues;

for each of the second wagering venues, determining a respective effect on a market in which the first wagering venue competes;

determining a consensus odds includes based on the respective odds for the wager at each of the second wagering venues such that each of the respective odds has an impact on the consensus odds that is proportional to the respective effect of the respective one of the second wagering venues on the market transmitting an indication of the consensus odds to the first wagering venue.

B. An apparatus comprising:

a processor; and a machine-readable medium having stored thereon a set of instructions, which when executed by the processor, cause the apparatus to perform a method comprising:

identifying a first wagering venue at which a wager may be placed;

receiving a plurality of respective indications, in which each respective indication indicates a respective odds for the wager at a respective one of a plurality of second wagering venues;

determining a set of second wagering venues that define a market in which the first wagering venue competes;

determining a consensus odds for the wager based on the respective odds for the wager at each of the second wagering venues of the set of second wagering venues; and transmitting an indication of the consensus odds to the first wagering venue.

B.1. The apparatus of claim B, in which each wagering venue includes a sports book.

B.2. The apparatus of claim B, in which the wager includes an in-game wager.

B.3. The apparatus of claim B, in which the wager includes a wager on a competition.

B.4. The apparatus of claim B, in which the market includes a geographic market.

B.5. The apparatus of claim B, in which the market includes a demographic market.

B.6. The apparatus of claim B, in which the set of second wagering venues includes at least one wagering venue located on a different continent than the first wagering venue.

B.7. The apparatus of claim B, in which the method further comprises receiving an indication of an odds for the wager at the first wagering venue and in which the consensus odds are also based on the odds for the wager at the first wagering venue.

B.8. The apparatus of claim B, in which the consensus odds includes at least one of a median odds, a mean odds, a mode odds, a lowest odds, a highest odds, and an odds based on a mathematical formula.

B.9. The apparatus of claim B, in which the method further comprises offering the wager from the first wagering venue with the consensus odds.

B.10. The apparatus of claim B, in which the method further comprises:

for each of the set of second wagering venues, determining a respective effect on the market; and in which determining the consensus odds includes determining the consensus odds such that each of the respective odds for the wager at each of the second wagering venues of the set has an impact on the consensus odds that is proportional to the respective effect of the respective one of the second wagering venues on the market.

C. An apparatus comprising:

a processor; and a machine-readable medium having stored thereon a set of instructions, which when executed by the processor, cause the apparatus to perform a method comprising:

determining an amount of money wagered on each side of the two sided wager proposition for which a first wagering venue is responsible;

determining a first amount of money that the first wagering venue may be responsible for paying out if the first side of the wager wins based on the amount of money wagered on the first side;

determining a second amount of money that the first wagering venue may take ownership of if the second side of the wager wins based on the amount of money wagered on the first side;

determining a total amount of money that the first wagering venue risks based on the first amount of money and the second amount of money;

identifying a consensus odds for the wager based on odds for the wager at a plurality of second wagering venues and an effect that each of the second wagering venues has on a market in which the first wagering venue competes;

determining that the total amount of money is too large at the consensus odds;

in response to determining that the total amount of money is too large, placing at least one of an order to buy responsibility for wagers on the second side on a wager exchange and an order to sell responsibility for wagers on the first side on the wager exchange.

D. An apparatus comprising:

a processor; and a machine-readable medium having stored thereon a set of instructions, which when executed by the processor, cause the apparatus to perform a method comprising:

identifying a desired odds for a two sided wager proposition;

determining an amount of money wagered on each side of the two sided wager proposition for which a first wagering venue is responsible;

determining a level of risk exposure to the first wagering venue for a first side of the two sided wager proposition based on the amount of money wagered on the first side;

determining an offsetting level of risk exposure to the first wagering venue for the first side of the two sided wager proposition based on the amount of money wagered on the second side;

determining that a total level of risk exposure to the first wagering venue based on the level of risk exposure and the offsetting level of risk exposure is too large at the desired odds;

in response to determining that the total level of risk exposure is too large, facilitating a transaction with a second wagering venue to adjust the amount of money wagered on at least one of the first side and the second side for which the first wagering venue is responsible.

D.1. The apparatus of claim D, in which each wagering venue includes a sports book.

D.2. The apparatus of claim D, in which the wager includes an in-game wager.

D.3. The apparatus of claim D, in which the wager includes a wager on a competition.

D.3.1. The apparatus of claim D.3, in which the first side of the wager includes a wager that a first sports team will win a particular game and the second side of the wager includes a wager that a second sports team will win the particular game.

D.4. The apparatus of claim D, in which the level of risk exposure includes an amount of money that the first wagering venue may be responsible for paying out if the first side of the wager wins, in which the level of offsetting risk exposure includes an amount of money that the first wagering venue may take ownership of if the second side of the wager wins, and in which the total level of risk exposure includes the level of risk exposure minus the offsetting level of risk exposure.

D.5. The apparatus of claim D, in which the total level of risk exposure is too large if the total level of risk exposure is above a certain threshold dollar amount.

D.6. The apparatus of claim D, in which identifying the desired odds includes determining a consensus odds based on odds for the wager at a plurality of third wagering venues.

D.6.1. The apparatus of claim D.6, in which the method further comprises:

receiving a plurality of respective indications, in which each respective indication indicates a respective odds for the wager at a respective one of the plurality of third wagering venues;

for each of the third wagering venues, determining a respective effect on a market in which the first wagering venue competes; and in which determining the consensus odds includes determining the consensus odds such that each of the respective odds for the wager at each of the third wagering venues has an impact on the consensus odds that is proportional to the respective effect of the respective one of the third wagering venues on the market.

D.7. The apparatus of claim D, in which facilitating the transaction includes placing at least one of an order to buy responsibility for wagers on the second side and an order to sell responsibility for wagers on the first side on a wager exchange.

D.8. The apparatus of claim D, in which the method further compromises offering the wager from the first wagering venue with the desired odds.

The invention claimed is:

1. A system for improving odds accuracy in a wagering market, the system comprising:

a user device;

a first wagering server associated with a first wagering venue; and a plurality of second wagering servers associated respectively with second wagering venues, the second wagering servers configured to calculate odds for wagers made in their respective wagering venues and then to send the calculated odds to the user device, wherein the user device is configured for:

displaying a stream of a live sporting event;

identifying a wager that may be placed at the first wagering venue by way of a user input on a wagering interface of the user device, the wager being associated with the stream of the live sporting event;

selecting from the plurality of second wagering venues those secondary venues that define a market in which the first wagering venue competes;

receiving a plurality of real-time feeds from at least a plurality of the selected second wagering venues, in which each real-time feed indicates respective odds for the wager associated with the stream of the live sporting event;

determining consensus odds for the wager based on the plurality of real-time feeds, wherein each of the plurality of selected secondary wagering venues has an impact on determining the consensus odds in proportion to an effect each secondary wagering venue has on the market;

transmitting an indication of the consensus odds to the first wagering venue; and offering, by way of the wagering interface, the wager with the consensus odds.

2. The system of claim 1, in which each wagering venue includes a sports book.

3. The system of claim 1, in which the wager associated with the stream includes an in-game wager that occurs after a start of the live sporting event.

4. The system of claim 1, in which the live sporting event includes a competition.

5. The system of claim 1, in which the plurality of second wagering venues includes at least one wagering venue located on a different continent than the first wagering venue.

6. The system of claim 1, in which the consensus odds include at least one of a median odds, a mean odds, a mode odds, a lowest odds, a highest odds, and an odds based on a mathematical formula.

7. A method for improving odds accuracy in a wagering system, the method comprising:

displaying, on a user device, a stream of a live sporting event;

identifying a wager that may be placed at a first wagering venue, the wager being associated with the stream of the live sporting event;

calculating, on each of a plurality of second wagering servers associated respectively with second wagering venues, odds for the wager as made in their respective wagering venues;

sending, by each of the plurality of second wagering servers, the calculated odds to the user device;

selecting, on the user device, from a plurality of second wagering venues those secondary venues that define a market in which the first wagering venue competes;

receiving, on the user device, a plurality of real-time feeds from at least a plurality of the selected second wagering venues, in which each real-time feed indicates respective odds for the wager associated with the stream of the live sporting event;

determining, on the user device, consensus odds for the wager based on the plurality of real-time feeds, wherein each of the plurality of selected secondary wagering venues has an impact on determining the consensus odds in proportion to an effect each secondary wagering venue has on the market;

transmitting, by the user device, an indication of the consensus odds to the first wagering venue; and offering the wager with the consensus odds.

8. The method of claim 7, in which each wagering venue includes a sports book.

9. The method of claim 7, in which the wager associated with the stream includes an in-game wager that occurs after a start of the live sporting event.

10. The method of claim 7, in which the live sporting event includes a competition.

11. The method of claim 7, in which the plurality of second wagering venues includes at least one wagering venue located on a different continent than the first wagering venue.

12. The method of claim 7, in which the consensus odds include at least one of a median odds, a mean odds, a mode odds, a lowest odds, a highest odds, and an odds based on a mathematical formula.

13. A system for improving odds accuracy in a wagering market, the system comprising:

a user device;

a first wagering server associated with a first wagering venue; and a plurality of second wagering servers associated respectively with second wagering venues, wherein the user device is configured to:

display a stream of a live sporting event;

identify a wager that may be placed at the first wagering venue, the wager being associated with the stream of the live sporting event;

select, from the plurality of second wagering venues, those secondary venues that define a market in which the first wagering venue competes;

receive a plurality of real-time feeds from at least a plurality of the selected second wagering venues, in which each real-time feed indicates respective odds for the wager;

determine consensus odds for the wager based on the plurality of real-time feeds, wherein each of the plurality of selected secondary wagering venues has an impact on determining the consensus odds in proportion to an effect each secondary wagering venue has on the market; and offer, in a wagering interface of the user device, the wager based on the consensus odds.

14. The system of claim 13, wherein the user device is configured to determine the consensus odds for the wager based on odds for the wager calculated by the first wagering server.

15. The system of claim 13, wherein the user device is configured to transmit an indication of the consensus odds to the first wagering venue.

16. The system of claim 13, wherein the user device is configured to identify the wager that may be placed at the first wagering venue in response to a request from the first wagering venue.

17. The system of claim 13, wherein the offering, in the wagering interface of the user device, the wager based on the consensus odds comprises displaying the consensus odds with the wager on a display of the wagering interface.

18. The system of claim 17, wherein the display is a touch-sensitive display.

19. The system of claim 18, wherein the consensus odds with the wager are displayed on the touch-sensitive display in response to a user touch to an image thereon, wherein the image is associated with the stream of the live sporting event.

20. The system of claim 19, wherein the user touch to the image triggers display of a betting interface overlay that displays the consensus odds with the wager and enables the user to select and place the wager.

* * * * *